United States Patent
Van Den Abeele et al.

(10) Patent No.: US 10,666,737 B2
(45) Date of Patent: May 26, 2020

(54) REDUCING A NUMBER OF SERVER-CLIENT SESSIONS

(71) Applicants: Koninklijke KPN N.V., Rotterdam (NL); IMEC VZW, Leuven (BE); Universiteit Gent, Ghent (BE)

(72) Inventors: Floris Van Den Abeele, Sint-Martens-Latem (BE); Jeroen Hoebeke, Sint-Denijs-Westrem (BE); Girum Teklemariam, Jimma (ET)

(73) Assignees: KONINKLIJKE KPN N.V., Rotterdam (NL); IMEC VZW, Leuven (BE); UNIVERSITEIT GENT, Ghent (BE)

( * ) Notice: Subject to any disclaimer, the term of this patent is extended or adjusted under 35 U.S.C. 154(b) by 381 days.

(21) Appl. No.: 14/655,509

(22) PCT Filed: Dec. 27, 2013

(86) PCT No.: PCT/EP2013/078047
§ 371 (c)(1),
(2) Date: Jun. 25, 2015

(87) PCT Pub. No.: WO2014/102320
PCT Pub. Date: Jul. 3, 2014

(65) Prior Publication Data
US 2016/0006818 A1    Jan. 7, 2016

(30) Foreign Application Priority Data
Dec. 28, 2012 (EP) .................................. 12199567

(51) Int. Cl.
*H04L 29/08*    (2006.01)
(52) U.S. Cl.
CPC .......... *H04L 67/141* (2013.01); *H04L 67/125* (2013.01); *H04L 67/14* (2013.01);
(Continued)

(58) Field of Classification Search
CPC . H04L 67/141; H04L 67/125; H04L 67/2819; H04L 67/14; H04L 67/12
(Continued)

(56) References Cited

U.S. PATENT DOCUMENTS 6,138,120 A * 10/2000 Gongwer ................ H04L 67/42
8,762,547 B2 * 6/2014 Stanev .................... H04L 67/14
                                                             709/228

(Continued)

FOREIGN PATENT DOCUMENTS

| EP | 1 303 102 A2 | 4/2003 |
| EP | 2 061 212 A1 | 5/2009 |
| WO | WO 2006/011770 A1 | 2/2006 |

OTHER PUBLICATIONS

Notification of Transmittal of the International Search Report and the Written Opinion of the International Searching Authority, PCT/EP2013/078047, dated Apr. 11, 2014.

(Continued)

*Primary Examiner* — Philip J Chea
*Assistant Examiner* — Wing Ma
(74) *Attorney, Agent, or Firm* — Hamilton, Brook, Smith & Reynolds, P.C.

(57) ABSTRACT

A method for an intermediary node to reduce a number of server-client sessions between a server (104) and a plurality of clients (102a, 102b, 102c) communicably connected to the server (104) over a network is disclosed. The intermediary node (106) intercepts a first request and a second request destined to the server (104) from a first client (102a; 102b; 102c) and a second client (102a; 102b; 102c). The intermediary node (106) establishes a server-client session, between the intermediary node (106) and the server (104), using the first request. If the first request overlaps in part with the second request and if a part of the second request is not overlapping with the first request, the intermediary
(Continued)

node (106) updates the server-client session between the intermediary node (106) and the server (104) to include a part of the second request.

10 Claims, 7 Drawing Sheets (52) U.S. Cl.
CPC ...... *H04L 67/2819* (2013.01); *H04L 67/2833* (2013.01); *H04L 67/12* (2013.01)

(58) Field of Classification Search
USPC .......................................................... 709/227
See application file for complete search history.

(56) References Cited

U.S. PATENT DOCUMENTS

| | | | | |
|---|---|---|---|---|
| 8,909,766 | B1* | 12/2014 | Hegg | H04L 41/08 709/224 |
| 2003/0084165 | A1* | 5/2003 | Kjellberg | H04L 63/08 709/227 |
| 2004/0268357 | A1* | 12/2004 | Joy | H04L 29/06 718/105 |
| 2005/0021616 | A1* | 1/2005 | Rajahalme | H04L 12/1818 709/204 |
| 2006/0035656 | A1* | 2/2006 | Sung | H04W 4/10 455/518 |
| 2006/0248119 | A1* | 11/2006 | Stanev | G06F 9/461 |
| 2006/0248199 | A1* | 11/2006 | Stanev | H04L 67/14 709/227 |
| 2006/0248200 | A1* | 11/2006 | Stanev | H04L 67/14 709/227 |
| 2007/0027896 | A1* | 2/2007 | Newport | H04L 67/14 |
| 2007/0150600 | A1* | 6/2007 | Barsness | G06F 11/3447 709/227 |
| 2007/0192454 | A1* | 8/2007 | Blea | H04L 67/14 709/223 |
| 2008/0147876 | A1* | 6/2008 | Campbell | H04L 67/06 709/232 |
| 2008/0189421 | A1* | 8/2008 | Langen | H04L 29/06 709/227 |
| 2009/0106571 | A1* | 4/2009 | Low | G06F 9/4856 713/310 |
| 2010/0082709 | A1* | 4/2010 | Yamamoto | G06F 16/93 707/812 |
| 2010/0100621 | A1* | 4/2010 | O'Connell | H04L 41/5012 709/224 |
| 2010/0257273 | A1* | 10/2010 | Mutikainen | H04L 65/1086 709/227 |
| 2010/0311392 | A1* | 12/2010 | Stenfelt | H04L 63/08 455/411 |
| 2010/0318570 | A1* | 12/2010 | Narasinghanallur | G06F 17/3056 707/783 |
| 2010/0325418 | A1* | 12/2010 | Kanekar | H04L 63/0823 713/151 |
| 2010/0325485 | A1* | 12/2010 | Kamath | G06F 11/2097 714/15 |
| 2011/0145287 | A1* | 6/2011 | Jiang | G06F 17/2247 707/780 |
| 2011/0154461 | A1* | 6/2011 | Anderson | H04L 63/0227 726/7 |
| 2011/0246552 | A1* | 10/2011 | Nicholson | H04L 67/14 709/202 |
| 2012/0289239 | A1* | 11/2012 | Luna | G06F 9/5016 455/452.1 |
| 2013/0124309 | A1* | 5/2013 | Traasdahl | H04L 67/22 705/14.49 |
| 2014/0172783 | A1* | 6/2014 | Suzuki | G06F 8/63 707/609 |
| 2014/0259147 | A1* | 9/2014 | L'Heureux | H04L 63/02 726/14 |
| 2014/0297876 | A1* | 10/2014 | Aquilina | G06F 3/0488 709/227 |
| 2017/0085652 | A1* | 3/2017 | Hsu | H04N 21/234345 |

OTHER PUBLICATIONS

European Search Report, EP 12199567.4, dated Apr. 3, 2013.

* cited by examiner

REDUCING A NUMBER OF SERVER-CLIENT SESSIONS

This application is the U.S. National Stage of International Application No. PCT/EP2013/078047, filed Dec. 27, 2013, which designates the U.S., published in English, and claims priority under 35 U.S.C. §§ 119 or 365(c) to European Application No. 12199567.4, filed Dec. 28, 2012.

FIELD OF INVENTION

The disclosure generally relates to the field of constrained devices accessible over a network. In particular, though not necessarily, the disclosure relates to methods, systems, an intermediary node, and a computer program product for reducing a number of server-client sessions supported by a server.

BACKGROUND

Devices, such as constrained devices, sensors, and actuators, deployed as a network of nodes have become useful for collecting and/or processing data in applications such as ambient intelligence, smart environments, and autonomous control. For example, networked sensors may be deployed in a building to measure the temperature and humidity such that an air conditioning system for the building may be adjusted autonomously. These networked nodes are generally referred to as constrained nodes or constrained devices in a (constrained) network, and each constrained node generally has at least one resource such as temperature and humidity. The nodes may be accessible, e.g., in an Internet-like network, where each device is a uniquely identifiable node, and the nodes act as servers to which clients can connect. Such a system of nodes may be referred to colloquially as "Internet of Things". The nodes may be in a wired network and/or a wireless network. In some situations, these nodes are constrained devices, having limited power and computing resources. The network that connects these objects may be referred to as low power and lossy networks (LLNs). Typically, each of the nodes has at least one resource. A resource may be associated with a state of the device and/or information associated with the device, or with an action that can be executed on the device. Examples of resource includes: "/temperature", "/humidity", "/room_location", "/picture", "/light_control", etc. Clients may query the node (i.e., the server) for the resource at the node.

These networked nodes are typically constrained in their functionality and computational resources and may be referred to as "constrained devices". With the advent of technologies such as 6lowpan, these nodes have become easily accessible over the Internet, e.g., in an Internet of Things situation. The nodes (i.e., servers) are potentially addressable by a large number of clients around the world. Some interactions between a client and a node are very short-lived (e.g., requesting the temperature). However, interaction models where, e.g., the state of a resource of a node is monitored over a longer period of time (whereby a relationship/session between the client and the server is maintained) have shown to be of importance for client applications, e.g., for use in the Internet of Things domain. Such an interaction model burdens these nodes, because the node has to maintain many server-client (data) sessions (e.g., server-client relationships) for a large number of clients. This problem is especially severe if these nodes are low in power, and an increase in load may lead to shorter lifetime for these devices.

SUMMARY

To alleviate the problems discussed herein, improved methods and systems for reducing a number of server-client sessions are disclosed. In the context of this disclosure, a server-client session is indicative of an end-to-end relationship between a server and a client (i.e., a node and a client). In such a relationship, a server may maintain, e.g., a data session or a data connection with the client wherein response(s) or a particular service is expected from the server over a period of time. Because servers are accessible by many clients, as the number of server-client session increases, the load on the server also increases. Further, in many cases, there is an upper limit to the number of simultaneous server-client sessions the server is able to support.

Generally, a node (i.e., the server) may include a device such as a sensor, an actuator, etc, which acts as a server for at least one client. Typically, the node (i.e., the server) may include a constrained device. A resource of a node may have information associated with that node and/or has a state associated with that node. A node having different measuring sensors such as a temperature sensor and a humidity sensor may be considered a node with resources including "/temperature" and "/humidity". A battery-powered node may be considered a node with a resource "/battery_level" or any suitable resource for revealing the node's battery level. A node located at a particular room in a building may be considered a node with a resource "/room_number" or any suitable resource which reveals information associated with the node. In some cases, a resource is associated with an action that can be executed on the node (e.g., such as turning on a light, or adjusting a setting of an air conditioner). A node capable of switching on or off the light may be considered as a node with a resource "/light_control". A node may be configured with certain capabilities, which may enable a node to respond to certain types of client requests and/or perform certain actions.

In particular, the method and systems for reducing a number of server-client sessions may be implemented at an intermediary node. The method is suitable for an intermediary node to reduce a number of server-client sessions between a server and a plurality of clients communicably connected to the server over a network. The server comprises a node acting as a server. Preferably, the intermediary node is located between the server and the clients in the network, and is configured to observe the communications destined to a server. The intermediary node is configured to intercept a first request destined to the server from a first client. Without the intermediary node, the first request would have been configured to setup a server-client session between the server and the first client. The intermediary node intercepts the first request, such that the first request is used by the intermediary node to establish a server-client session between the server and the intermediary node. In a way, the intermediary node has setup the server-client session on behalf of the first client and manages said server-client session at the intermediary node. A second request destined to the server from a second client is intercepted by the intermediary node.

An opportunity arises to reduce a number of server-client sessions if the first request and the second request are combinable, where the first request is different from the second request. More specifically, the intermediary node determines whether the first request overlaps at least in part with the second request and if a part of the second request is not overlapping with the first request. If this condition is met, the first request and the second request are combinable into an aggregate server-client session, and the intermediary node updates the server-client session between the intermediary node and the server to include a part of the second request that is not overlapping with the first request. Through this update, the (aggregate) server-client session would then also accommodate the second request along with the first request in one server-client session.

Data received from the server in this aggregate server-client session may be used to respond to the first client and the second client. Without such an aggregate server-client session, the first request and the second request would have otherwise set up two separate server-client sessions, which both have to be maintained by the server (e.g., the constrained node). Accordingly, the aggregate server-client session between the server and the intermediary node reduces the number of server-client sessions the server (e.g., constrained device) has to maintain and thus saves resources for the server.

If the existing relationship already includes the second request, i.e., if the two requests overlap but there is not a part of the second request that is not overlapping with the first request, the established server-client session is not updated.

An overlap exists between a first request and a second request if response(s) to the first request and responses(s) to the second request have data or information that is redundant. For instance, a response to the first request and a response to the second request (transmitted over respective server-client sessions) may be the same, or a response to the first request is derivable from a response to the second request. It is thus redundant for the server to maintain two separate server-client sessions to transmit overlapping responses for these two separate requests. If an overlap exists between the first request and the second request, the overlapping responses may be transmitted just once over a single combined server-client session. By combining two overlapping requests such that a single server-client session may serve both requests reduces the redundancy and the number of server-client sessions that a server has to maintain. For a server that has limited resources, such a reduction in the number of server-client sessions may help conserve computational and power resources.

According to one aspect, the intermediary node receives data from the server over the server-client session in accordance with the first request and the second request. The intermediary node derives a first response and optionally a second response from the data, said first response in accordance with the first request and said second response in accordance with the second request. According to another aspect, the intermediary node transmits the first response in response to the first request to the first client. Optionally, the intermediary node transmits the second response in response to the second request to the second client. Advantageously, the clients receive responses according to the respective requests that the clients transmitted, even though two separate server-client sessions were not set up with the server. In some cases, the clients are not aware of the presence of the intermediary node managing the server-client session for a plurality of clients. As such, the first response and the second response may be generated as if they originated from the server.

According to one aspect, the intermediary node determines a first information set requested by the first request and a second information set requested by the second request. The information sets comprise information that is expected by the client from the server in accordance with the requests. If the server is transmitting information that is redundant to different clients, the intermediary node advantageously removes the redundancy. Accordingly, the determining whether the first request overlaps at least in part with the second request comprises determining whether the first information set overlaps the second information set and/or whether at least part of the second information set is derivable from at least a part of the first information set.

According to one aspect, the intermediary node filters at least a part of the first information set to generate a filtered information set in accordance with the second request. The intermediary node then transmits the filtered information set to the second client in response to the second request. Advantageously, transmission of overlapping information by the server (i.e., the constrained node) to serve the two requests is avoided via the processing of the intermediary node (e.g., preferably a less constrained node) to duplicate the overlapping information and distributing it to the respective clients according to the respective requests.

According to one aspect, at least a part of the first information set is in a first format and the second information set is in a second format different from the first format. The intermediary node may be configured to translate information from the second format to the first format and/or vice versa. Accordingly, the intermediary node translates the at least a part of the first information set to generate a translated information set in the second format. The intermediary node then transmits the translated information set to the second client in response to the second request. Advantageously, the transmission of overlapping information by the server (i.e., the constrained node) to serve the two requests is avoided (even though the information requested by the clients is not exactly the same) when the intermediary node is configured to process/translate at least a part of one information set from one format to another format to derive the overlapping information in a suitable format and transmit that overlapping information to the respective client.

According to one aspect, determining whether the first request overlaps in part with the second request comprises comparing the first request and the second request against at least one known pattern, each known pattern indicating a type of server-client session. According to another aspect, the at least one known pattern is adapted to match against requests defined in different protocols. Such pattern matching, in some cases, technology-specific pattern matching to handle matching requests defined in different protocols, enables the intermediary node to analyze properties of the requests to determine whether and how to combine requests that are different from each other.

According to one aspect, determining whether the first request overlaps at least in part with the second request comprises determining whether the first request and the second request both indicate a first condition and a second condition, respectively. Generally speaking, a condition defines the information set that the client expects from the server. In other words, a condition describes an information set that is requested by the client. A resource on the server is observed through the first request and the second request, and the first condition at least in part overlaps with the second condition. Overlapping conditions in conditional observe requests are advantageously detected and combined by the intermediary node, e.g., if a first information set defined by the first condition overlaps with a second information set defined by the second condition. Such a reduction in the number of server-client sessions maintained by the server (i.e., the number of conditional observe or observe server-client sessions) is effectively reduced through the combination of conditions.

According to one aspect, determining whether the first request overlaps at least in part with the second request comprises determining whether the first request and the second request both indicate a first frequency and a second frequency, respectively, at which a same resource on the server is observed, wherein the first frequency is an integer multiple of the second frequency. A frequency, which may be a condition, defines the information set that the client expects from the server (i.e., only information/data that is associated with a particular timing is received by a client). Advantageously, a single server-client session according to the higher frequency may be used to server both the first request and the second request, thereby reducing the number of server-client sessions maintained by the server.

According to one aspect, the first request and second request are both conditional observe requests having any one of the following pairs of first condition and second condition. Said first condition may overlap at least in part with the second condition in these pairs:

| pair | first condition | second condition |
|------|-----------------|------------------|
| 1 | Step= | Step= |
| 2 | Value= | Value= |
| 3 | Value= | Value<> |
| 4 | Periodic | Periodic |
| 5 | AllValues< | AllValues< |
| 6 | AllValues> | AllValues> |
| 7 | AllValues> | AllValues< |
| 8 | Step= | Value= |
| 9 | Allvalues> | Value= |
| 10 | Allvalues< | Value= |
| 11 | AllValues< | Value<> |
| 12 | AllValues> | Value<> |
| 13 | AllValues< | Step= |
| 14 | AllValues> | Step= |

The "Step=" condition specifies a minimum state change in a resource on the server before a response is sent to a client.
The "Value=" condition indicates a response is sent to a client when a state of the resource in the server is equal to a value specified in the "Value=" condition.
The "Value<>" condition indicates a response is sent to a client when a state of the resource in the server passes a threshold value, in either direction of the threshold, specified in the "Value<>" condition.
The "Periodic" condition indicates a periodic interval where a response is sent to a client.
The "AllValues<" condition indicates a response is sent when a state of the resource in the server is less than a value specified in the "AllValues<" condition.
The "AllValues>" condition indicates a response is sent when a state of the resource in the server is greater than a value specified in the "AllValues>" condition. Advantageously, conditions that are similar to each other and less similar to each other may be combined according to the pairs enumerated above. A single server-client session having the combined condition from the first condition and the second condition may then serve both clients.

According to one aspect, the intermediary node stores the first condition and the second condition. The intermediary node then processes data received from the server to determine whether the data meets the first condition and/or the second condition. If the data or the timing of the data meets the first condition, the intermediary node derives and transmits the first response to the first client. If the data or the timing of the data meets the second condition, the intermediary node derives and transmits the second response to the second client. Advantageously, the responses are distributed to the clients according to the respective conditions. In some embodiments, if only changes in the state are reported, the intermediary node further checks previous response(s) transmitted to the node to determine whether the response represents a state change that ought to be transmitted to the client.

According to one aspect, the intermediary node receives a third request from a first client to terminate the first request, and/or determining the first request has expired. Responsible for managing server-client sessions on behalf of the clients, the intermediary node accordingly updates the server-client session between the intermediary node and the server to remove a part of the first request, said part not overlapping with the second request. As such, the intermediary node is able to remove/update server-client sessions as clients submit requests to leave or exit a particular server-client session. Such requests are handled gracefully by the intermediary node.

According to one aspect, the server comprises a constrained device. When the number of server-client sessions supported by the server, i.e., constrained device is reduced, the server's computational and/or power resources are conserved. The advantages of the disclosed embodiments are particularly evident for constrained devices, which are often not suitable for supporting a large number of server-client sessions. Furthermore, offloading the functionality of being able to observe and combine server-client sessions to an intermediary node alleviates the burden from the server to implement such a functionality.

According to another aspect, the server is communicably connected to the intermediary node over a low power and lossy network. By reducing the server-client sessions supported by the server over the lower power and lossy network, the load on the constrained environment is advantageously reduced and the lifespan is advantageously increased.

An intermediary node for reducing a number of server-client sessions in a network between a server and a plurality of clients is disclosed. The intermediary node comprises at least a receiver and a relationship manager. The receiver is configured for intercepting, at the intermediary node, a first request destined to the server from a first client. The relationship manager is configured for establishing a server-client session between the intermediary node and the server using the first request. The receiver is further configured for intercepting, at the intermediary node, a second request destined to the server from a second client, said second request being different from the first request. The relationship manager (and if applicable, a pattern analyzer of the intermediary node) is further configured for determining whether the first request overlaps in part with the second request. If the first request overlaps in part with the second request and if a part of the second request is not overlapping with the first request, the relationship manager updates the server-client session between the intermediary node and the server to include a part of the second request. The intermediary node may be configured to implement any of the methods disclosed herein.

The disclosure may also relate to a computer program product, implemented on computer-readable non-transitory storage medium, wherein the computer program product may comprise software code portions configured for, when run a computer, executing the method steps according to any of the methods described in the present disclosure. The computer program product is may be implemented at least in part in any of: an intermediary node, a pattern analyzer, a storage, a relationship manager, a transmitter, a receiver, a client, a server, and a gateway node, etc.

The disclosure will further be illustrated with reference to the attached drawings, which schematically show embodiments according to the disclosure. It will be understood that the disclosure is not in any way restricted to these specific embodiments. Hereinafter, embodiments of the invention aiming to alleviate the problem(s) described above will be described in further detail. Moreover, combinations of any of the embodiments and limitations are envisioned by the disclosure.

BRIEF DESCRIPTION OF THE DRAWINGS

Aspects of the invention will be explained in greater detail by reference to exemplary embodiments shown in the drawings, in which.

DETAILED DESCRIPTION

Figure 1A:
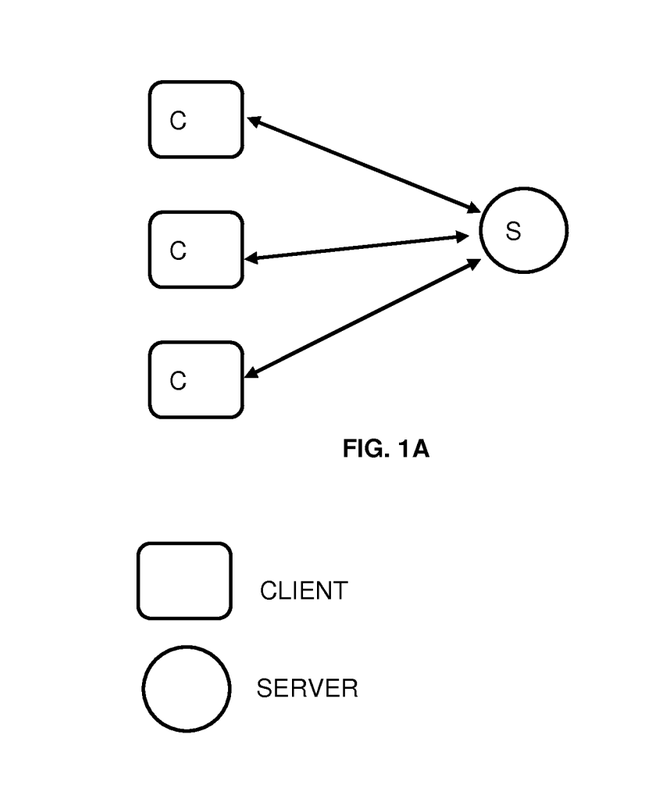
FIG. 1A shows an illustrative system where a server maintains a plurality of server-client sessions.

FIG. 1A shows an illustrative system where a server maintains a plurality of server-client sessions. The illustrative system depicts three clients (denoted with the letter "C") and a server (denoted with the letter "S"). The arrows indicate illustratively that the server (e.g., a constrained node) maintains three server-client sessions. A server-client session between a server (e.g., a node) and a client typically spans over a period of time and may include at least one request/response.

The client may include (user) applications configured to transmit requests to nodes acting as servers. Each node is associated with a node identifier (such as an address of the node in a network), at least one resource, and/or at least one capability. The clients may request information regarding resource(s) on a node, and/or request the node to perform an action according to the capability(-ies) of the node. The nodes may be constrained devices acting as a server for one or more clients. Although only three are shown, any number of clients (at least two) are envisioned.

For instance, clients may be interested in changes in the value of a resource of a server (i.e., a node acting as a server) over a period of time in a server-client session between the client and the server. This server is burdened with managing many server-client relationships with a plurality of clients. A large number of potential clients may be undesirable or unfeasible for constrained devices having limited computational resources. Thus, it is desirable to reduce the server-client sessions that a server has to maintain.

Figure 1B:
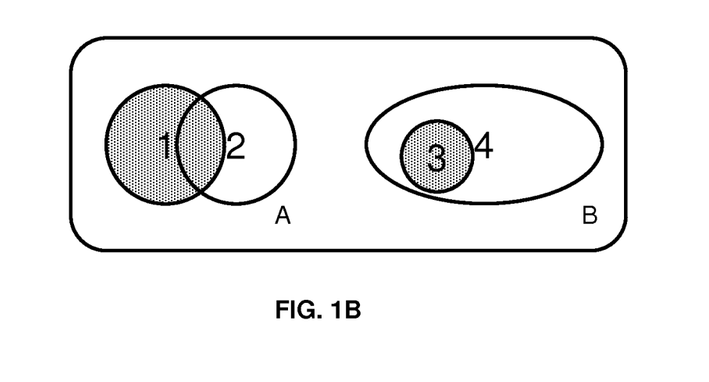
FIG. 1B shows an illustrative system where a server maintains a server-client session with an intermediary node, according to one embodiment of the disclosure.

FIG. 1B shows an illustrative system where a server maintains a server-client session with an intermediary node, according to one embodiment of the disclosure. The system 100 comprises at least two clients (shown as three clients 102a, 102b, and 102c), an intermediary node 106, and a server 104. The intermediary node is configured to determine whether different requests are combinable and to reduce the number of server-client sessions. Advantageously, by reducing the load on the servers (e.g., constrained devices), the battery-life of the server or the lifetime of any constrained network over which the server and intermediary are communicably connected may be extended.

The clients are communicably connected to the intermediary node over a wired or wireless (or a combination of both) communication network, and the intermediary node is communicably connected to the server over a wired or wireless (or a combination of both) communication network. In some cases, the communication network to which the server is connected is lossy and/or unreliable. Generally, the client is configured to access the intermediary node and the server through a server-client relationship, using a protocol such as Constrained Application Protocol (CoAP) to transmit communications over the network from the client to the intermediary node and/or the server.

Accordingly, the intermediary node provides the function to reduce the number of server-client sessions maintained by the server. For instance, the intermediary node maintains a single server-client session on behalf of the at least two clients by updating the existing server-client session to accommodate a part of a new request (e.g., a different request but overlapping an earlier request which initiated the existing server-client session) that is not already being covered by the existing server-client session. As a result, the single server-client session is able to serve a plurality of clients.

Presumably, these clients may operate independently without being aware of other clients' presence. Each client may be aware of only its own server-client sessions with the server. This nature of the system makes clients unsuitable to determine requests from different clients that are overlapping with each other, because a client does not have an overview of all the server-client sessions across all the clients. Furthermore, if the servers themselves have limited computational resources, the servers are not suitable candidates to combine server-client sessions either. Accordingly, the functionality to reduce the number of server-client sessions may be implemented outside of the constrained environment (e.g., on a constrained device in a lossy network), and somewhere located along the path between clients and the server. For instance, the intermediary node 106 may be implemented at an edge of the network (e.g., at a gateway node) to which the node is connected, and the intermediary node is configured to intercept communications between clients and the server. Preferably, the intermediary node is a non-constrained device.

The intermediary node includes a receiver 108, a transmitter 110, a pattern analyzer 112, a relationship manager 114, and a storage 116. The receiver is configured to receive (or intercept) communications from clients and/or nodes. The transmitter is configured to transmit communications to clients and/or nodes. By intercepting communications, the intermediary node can observe the various server-client sessions (using the pattern analyzer), and determine whether there is any redundancy that can be removed from the system. Such a redundancy exists when two different requests (from different clients) have an overlap or are overlapping with each other. If there is an overlap, then the relationship manager updates an existing server-client session to include a part that is not already covered by the existing server-client session.

One exemplary case of an overlap between two requests is illustrated schematically as situation "A". The overlap occurs when a first request and a second request (different from the first) requests a first information set (denoted by "1") from the client and a second information set from the client (denoted by "2") respectively, and the first information set overlaps with the second information set. A part of one information set is not present in the other information set. If the first request was used to establish a server-client session, the existing server-client session between the intermediary node and the server is updated by the relationship manager to combine the requests and to include a part of the second request into the existing server-client session (i.e., represented by the part of the second information set not overlapping with the first information set denoted as the white portion of circle "2").

Another exemplary case of an overlap between two requests is illustrated schematically as situation "B". The overlap occurs when a first request and a second request (different from the first) requests a third information set (denoted by "3") from the client and a fourth information set from the client (denoted by "4") respectively, and the third information set overlaps with the fourth information set. A part of the fourth information set is not present in the third information set. If the third request was used to establish a server-client session, the existing server-client session between the intermediary node and the server is updated by the relationship manager to combine the requests and to include a part of the fourth request into the existing server-client session (i.e., represented by the part of the fourth information set not overlapping with the first information set shown as the white portion of oval "4"). If the fourth request was used to establish the server-client session, the existing server-client session remains the same or is not updated, but the relationship manager updates locally that the client from whom the fourth request is transmitted receives responses according to the fourth request from the existing server-client session.

An overlap may also exist if at least a part of one information set is derivable from at least a part of another information set. In other words, the overlap exists because at least a part of the information set can be transformed to become at least a part of the other information set. For instance, the intermediary node (e.g., the relationship manager) may additionally process a part of one information set for a first request to derive information which may be provided to the respective client in accordance with a second request (without having to set up a separate server-client session).

Specifically, the pattern analyzer of the intermediary node is configured to analyze the intercepted requests to determine whether they are suitable for combination. The intermediary node establishes server-client sessions on behalf of the clients, and updates existing server-client sessions if redundancy is found. After combining requests into a (single) server-client relationship, the relationship manager maintains said server-client relationship on behalf of the different clients and ensures that proper responses are generated and transmitted back to the respective clients.

The pattern analyzer is configured to analyze intercepted requests and match the intercepted requests against known patterns that indicate a type of server-client session. These known patterns may be stored in storage. The intercepted requests may be technology-specific (e.g., the communication protocol or format used may be different from one request to another), thus the pattern analyzer may be configured advantageously to analyze the intercepted request across a plurality of technologies. For instance, the intercepted request may be first analyzed by a technology-specific layer which determines the type of technology used in the request. The technology-specific layer, after determining which technology was used, passes the request and any associated properties to another layer to determine which type of server-client session the request represents, e.g., by matching the technology-specific request against known patterns indicating different types of server-client sessions.

Upon identifying the type of server-client sessions, the relationship manager may, e.g., apply rules or artificial intelligence algorithms, to combine different requests associated with a particular type of (combinable) server-client session. The relationship manager may apply rule-based logic, self-learning methods, and/or profile based ruling for identifying overlapping requests and combining those overlapping requests. The relationship manager is further configured to establish and maintain the server-client sessions and update them when necessary. Information relating to the server-client relationships enabling the relationship manager to handle the plurality of clients may be stored in the storage. For example, the storage may store associations between a client with a particular established server-client session and the request that was destined to the server. To establish server-client sessions (on behalf of the client), the relationship manager is configured to derive and transmit (e.g., using the transmitter of the intermediary node) requests to the server for initializing the server-client session. The relationship manager is further configured to maintain the server-client session for a plurality of clients by processing response(s) from the server, and generating response(s) to either or both of the clients according to the respective requests transmitted from the clients.

In some cases, the relationship manager is configured to detect when a client terminates a server-client session and to update the existing server-client session accordingly. For instance, a further request is received from a client to terminate (the server-client session of) the first request. Alternatively or additionally, the relationship manager determines that the first request has expired. The relationship manager is configured to update the server-client session between the intermediary node and the server to remove a part of the first request that does not overlap with the second request.

Figure 2:
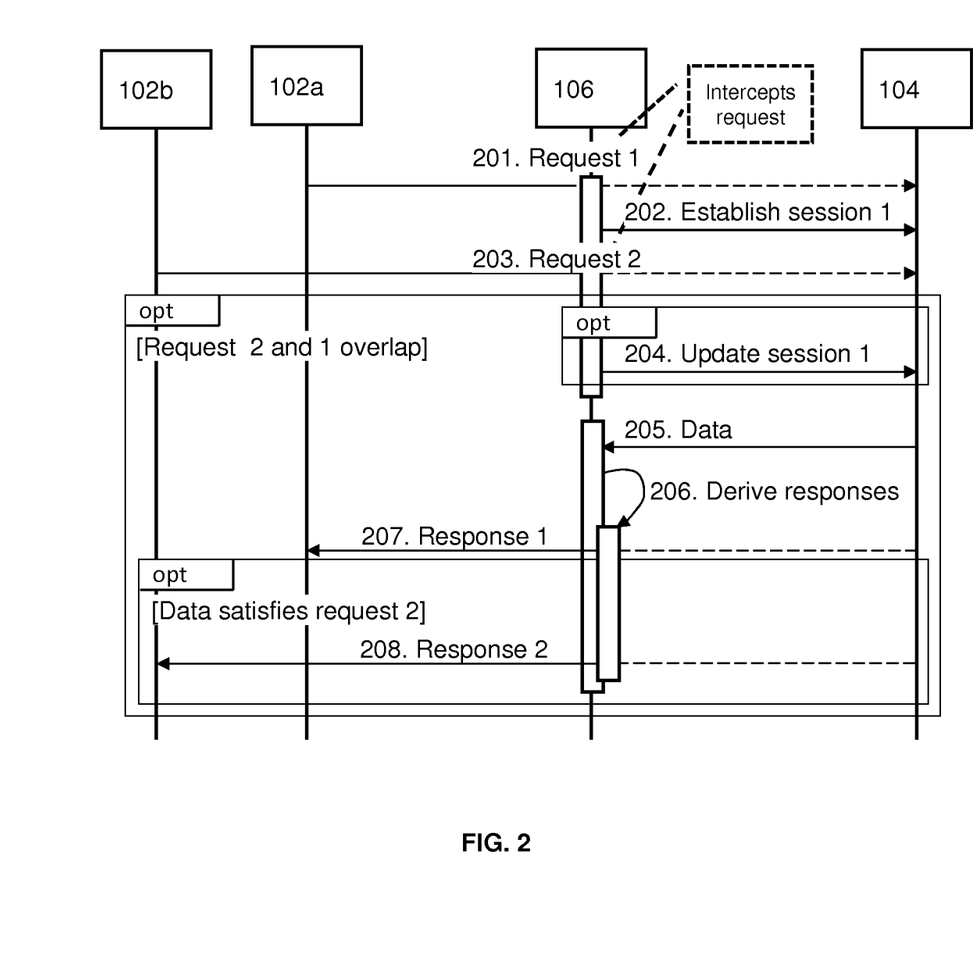
FIG. 2 shows an exemplary messaging diagram illustrating methods for reducing a number of server-client sessions maintained by a client, according to one embodiment of the disclosure.

FIG. 2 shows an exemplary messaging diagram illustrating methods for reducing a number of server-client sessions maintained by a client, according to one embodiment of the disclosure. The server-client sessions may be established between the server 104 and at least the first client 102a and the second client 102b. The intermediary node 106 intercepts a first request destined to the server from a first client (step 201). At this point, the intermediary node may provide the first request to a pattern analyzer for processing. The pattern analyzer may determine which type of server-client session the request represents and optionally at least one property of the server-client session that the first request aims to set up (e.g., properties describing the information set that the first client is expecting from the server). If the pattern analyzer determines that the request represents a type of server-client session, the pattern analyzer provides an indication to the relationship manager to store the first request (or a derivation of the first request) in the storage. The intermediary may perform these steps to maintain an overview of server-client sessions for a server. When the first request represents a server-client session, the intermediary node establishes a server-client session between the intermediary node and the server using or in accordance with the first request (step 202). The intermediary node may store in the storage that said server-client session is associated with the first client and the first request.

The intermediary node intercepts a second request destined to the server from a second client (step 203). The second request is different from the first request. This disclosure is not intended to address the situation where the two requests are the same (e.g., where the two requests from different clients are requesting the same information or data from the node). The solution to combine requests that are the same is trivial and is not intended to be part of the methods and systems disclosed herein. At this point, the intermediary node may provide the second request to the pattern analyzer for processing. The pattern analyzer may determine which type of server-client session the request represents and optionally at least one property of the server-client session that the second request aims to set up (e.g., properties describing the information set that the second client is expecting from the server). If the pattern analyzer determines that the request represents the same type of server-client session, the first request and the second request may be considered combinable. The pattern analyzer provides an indication to the relationship manager to store the second request (or a derivation of the second request) in the storage.

The relationship manager determines whether the first request overlaps in part with the second request, e.g., according to the methods and systems relating to FIG. 2. If the first request overlaps in part with the second request, e.g., the first information set expected from the first client with the first request overlaps with the second information set expected from the second client. When such an overlap occurs, it is possible for a single server-client session to serve the first client and the second client. If there is a part of the second request which is not already served by the (established) server-client session (e.g., if the first request overlaps in part with the second request and if a part of the second request is not overlapping with the first request), the intermediary node may update the (established) server-client session to include a part of the second request which is not overlapping with the first request (step 204). Accordingly, the updated server-client session serves both the first client and the second client (although not directly) in accordance with the first request and the second request. As a result, the number of server-client sessions that the server has to maintain is advantageously reduced (e.g., from two to one). If there is not a part of the second request which is not already served by the (established) server-client session (e.g., if the first request overlaps with the second request, and covers the second request completely), the intermediary node may keep the (established) server-client session. The relationship manager may store in the storage to associate the second client with the second request and the (established) server-client session.

The intermediary node receives data from the server over the server-client session in accordance with the first request and the second request (step 205). This step may comprise receiving responses from the server over the server-client session. The intermediary node, responsible for generating response(s) to the clients, accordingly derives and transmits a first response from the data received over the server-client session in accordance with the first request (steps 206 and 207). If applicable, the intermediary node derives and transmits a second response from the data received over the server-client session in accordance with the second request (step 208).

The intermediary node takes the responsibility to ensure that the clients receive responses in accordance with the respective requests that the client had transmitted. For instance, the intermediary node (e.g., the relationship manager), checks whether the data matches the information set that is expected by the first client according to the first request. If true, then the intermediary node generates and transmits a first response to the first client in response to the first request to the first client (step 207). If the data matches the information set that is expected by the second client according to the second request, then the intermediary node generates and transmits a response to the second client in response to the second request to the second client (step 208).

Figure 3:
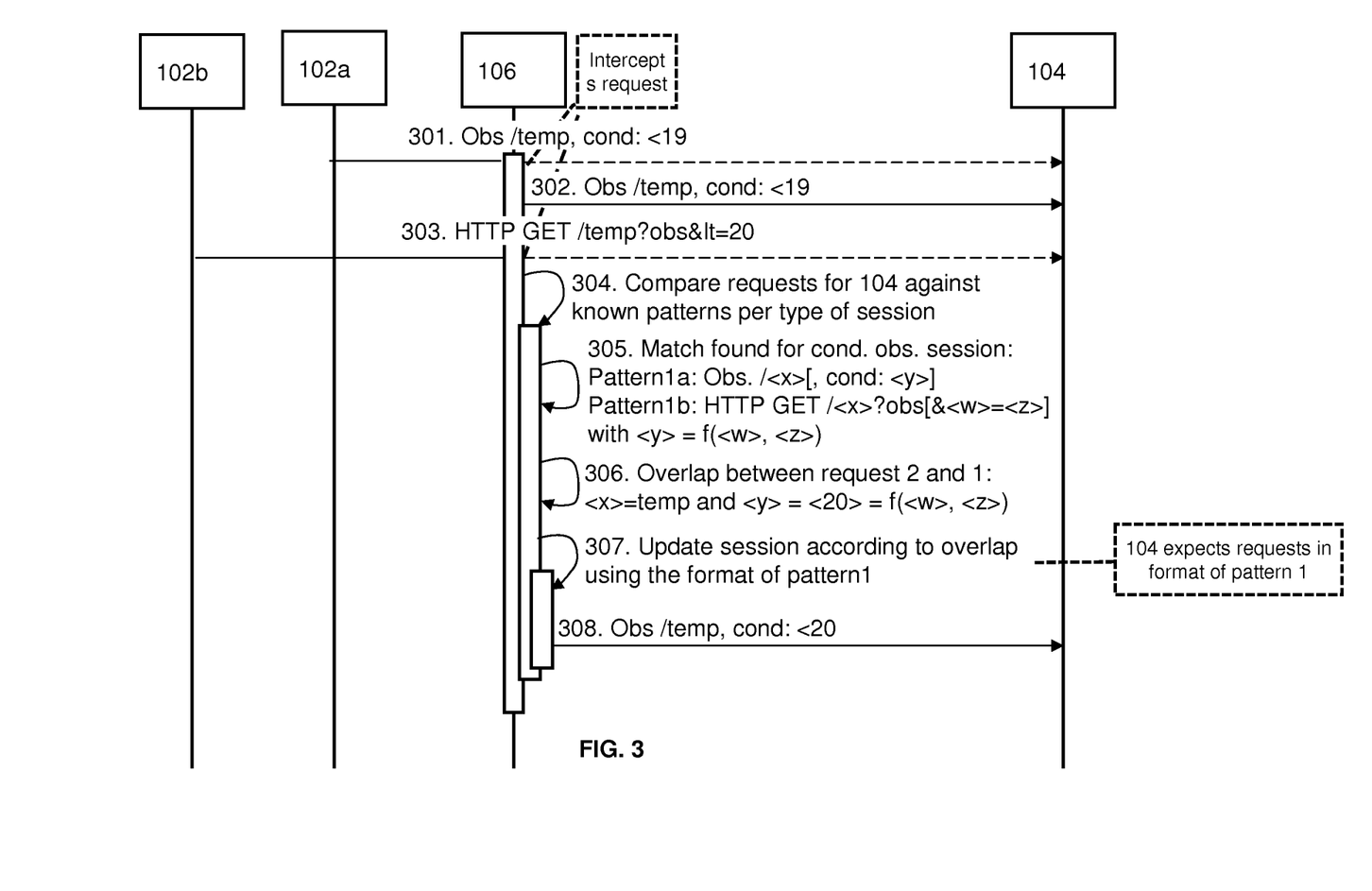
FIG. 3 shows an exemplary messaging diagram illustrating methods for comparing requests against known patterns of server-client sessions, according to one embodiment of the disclosure.

FIG. 3 shows an exemplary messaging diagram illustrating methods for comparing requests against known patterns of server-client sessions, according to one embodiment of the disclosure. In the illustrative example, the intermediary node (e.g., the pattern analyzer) is advantageously configured to match requests against known patterns of server-client sessions, even when the technology (or the protocol) used for defining the requests are different. Known patterns of server-client sessions each indicate a type of server-client session. For example, requests which represent a particular type of server-client session may be candidates for combining said requests or may be considered combinable with each other to reduce the number of server-client sessions maintained by the server. For instance, an intermediary node 106 intercepts a first conditional observe request to receive a value for a resource "/temp" of node 104 if the state of the resource changes and meets a specified condition (step 301). The first conditional observe request is defined using Constrained Application Protocol (CoAP). For instance, the first conditional observe request includes "Obs/temp, cond: <19", meaning the condition is defined to be "values less than 19", and the conditional observe request requests a response from the server having a value of the resource if the state of the resource changes and the state of the resource /temp is less than 19. Such a request indicates a particular type of server-client session. The conditional request is transmitted by a first client 102a and destined to the node. On behalf of the first client, the intermediary node establishes a server-client session according to the first conditional observe request (step 302). The intermediary node intercepts a second conditional observe request (step 303). For instance, the second conditional observe request includes "HTTP GET /temp?obs<=20". This exemplary second conditional observe request is defined using HyperText Transfer Protocol (HTTP), a protocol that is different from the protocol used in the first conditional observe request.

The intermediary node compares the first conditional observe request and the second conditional observe request against at least one known pattern (step 304). Even though the first conditional observe request and the second conditional observe request are defined using different protocols, a pattern analyzer is adapted to handle matching technology-specific requests. For instance, the known patterns may be adapted to match against requests that are defined using different protocols. Accordingly the intermediary node may ascertain whether the two requests defined in different protocols represent the same type of server-client session.

The pattern analyzer may include a technology-specific layer having at least the following known patterns:
Pattern1a: Obs. /<x>[, cond: <y>]
Pattern1b: HTTP GET /<x>?obs[&<w>=<z>]
with <y>=f(<w>, <z>)

Based on the patterns, a match with Pattern1 is found because the first conditional observe request matches Pattern1a and the second conditional observe request matches Pattern1b (step 305). The relationship manager then determines the overlap between the first conditional observe request and the second conditional observe request (step 306), e.g., <x>=temp and <y>=<20>=f(<w>, <z>). If applicable, the relationship manager updates the established server-client session (step 307). In the example, because the first request is requesting to observe changes to the state of the "/temp" resource less than 19, the established server-client session is updated to observe changes to the state of the "/temp" resource less than 20 (step 308) to include a part of the second request that is not already served by the established server-client relationship.

Although the example shows a first conditional observe request and a second conditional observe request, one skilled in the art would appreciate that other types of combinable requests (e.g., representing other types of server-client sessions) are also envisioned to be applicable to this example.

Note that different protocols are used by the first and second client, but only one protocol is used for the server-client session between the intermediary node and the server. Advantageously, the server (e.g., a constrained node) is only required to support the protocol used for the server-client session. The intermediary node is configured to process the data received over the server-client session to derive responses according to the different protocols used by the different clients.

This example may be generalized (same protocol or not the same protocol being used) to combining conditional observe requests where the conditions in the requests are combinable. Accordingly, the intermediary node determines whether the first request and the second request indicate a first condition and a second condition, respectively (e.g., less than 19 and less than 20), to which the same resource on the server is observed. Determining whether the two requests overlap thus comprises determining whether the two conditions comprise an overlap (e.g., the first condition at least in part overlaps the second condition).

Figure 4:
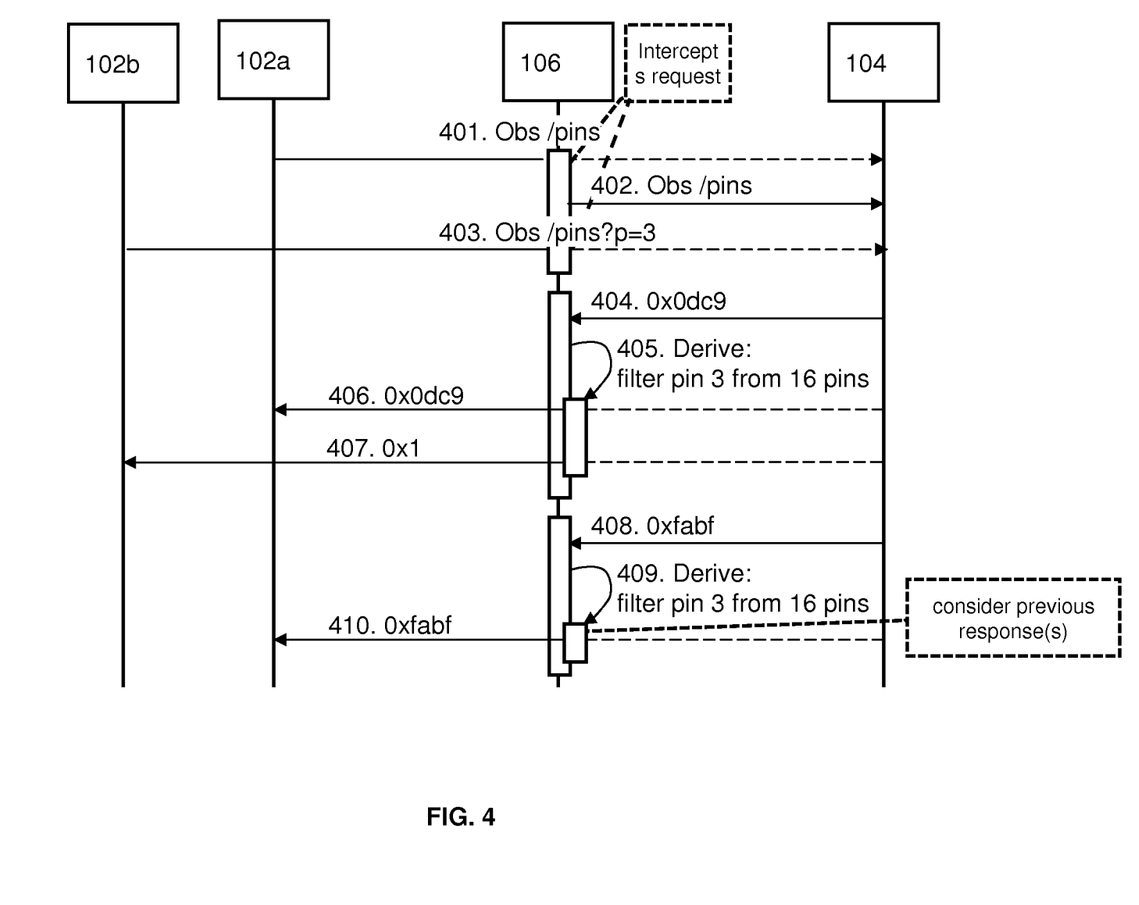
FIG. 4 shows an exemplary messaging diagram illustrating methods for combining two different observe requests, according to one embodiment of the disclosure.

FIG. 4 shows an exemplary messaging diagram illustrating methods for combining two different observe requests, according to one embodiment of the disclosure. A first request is intercepted by an intermediary node 106, wherein the first request is transmitted from a first client 102a and is destined to the server 104 (step 401). An example of the first request comprises an observe request "Obs /pins" to observe the value of the signals on all the pins, such as pins 0 to 15 (16 pins with 16 bits of information in its state). On behalf of the first client, the intermediary node establishes a server-client session according to the first request with the server (step 402). A second request is intercepted by an intermediary node 106, wherein the second request is transmitted from a second client 102b and is destined to the server 104 (step 403). An example of the second request comprises an observe request "Obs /pins?p=3" to observe the value of the signal on pin 3 only, (with 1 bit of information in its state). Because the second request is already served by the established server-client session, the server-client session is not updated.

Upon receiving data from the server "0x0dc9" (step 404), suitable responses are generated in accordance with the first request (and if applicable, the second request) (e.g., step 405. The intermediary node derives and transmits a first response which forwards the data "0x0dc9" (least significant bit 0) to the first client in response to the first request (step 406). The intermediary node processes the data by filtering the data "0x0dc9" to derive a second response having the data "0x1" to obtain the value only for pin 3 (step 405). The intermediary node transmits the second response to the second client in response to the second request (step 407). Upon receiving further data from the server "0xfabf" (step 408), suitable responses are generated in accordance with the first request (and if applicable, the second request). The intermediary node derives and transmits a third response which forwards the data "0xfabf" to the first client in response to the first request (step 410). The intermediary node processes the data by filtering the data "0x0dc9" to derive filtered data, and determine whether the state has changed (step 409). The intermediary node may have previous states or responses to the nodes saved and the intermediary node may consider previous response(s) transmitted to the second node. In this example, the state for pin 3 has not changed, and thus a response having the data "0x1" is not transmitted.

This example illustrates the intermediary node filtering at least a part of a first information set requested by the first request to generate a filtered information set in accordance with a second request. The filtered information set is then transmitted to the second client in response to the second request. The filtering may be performed within the data of a particular response provided by the server (e.g., filtering out a part of the data in a single response), or the filter may be performed over the information in a plurality of responses provided by the server (e.g., filtering out some responses over a plurality of responses to not send a particular response to a client). The latter is illustrated in an example in relation to FIG. 6.

Figure 5:
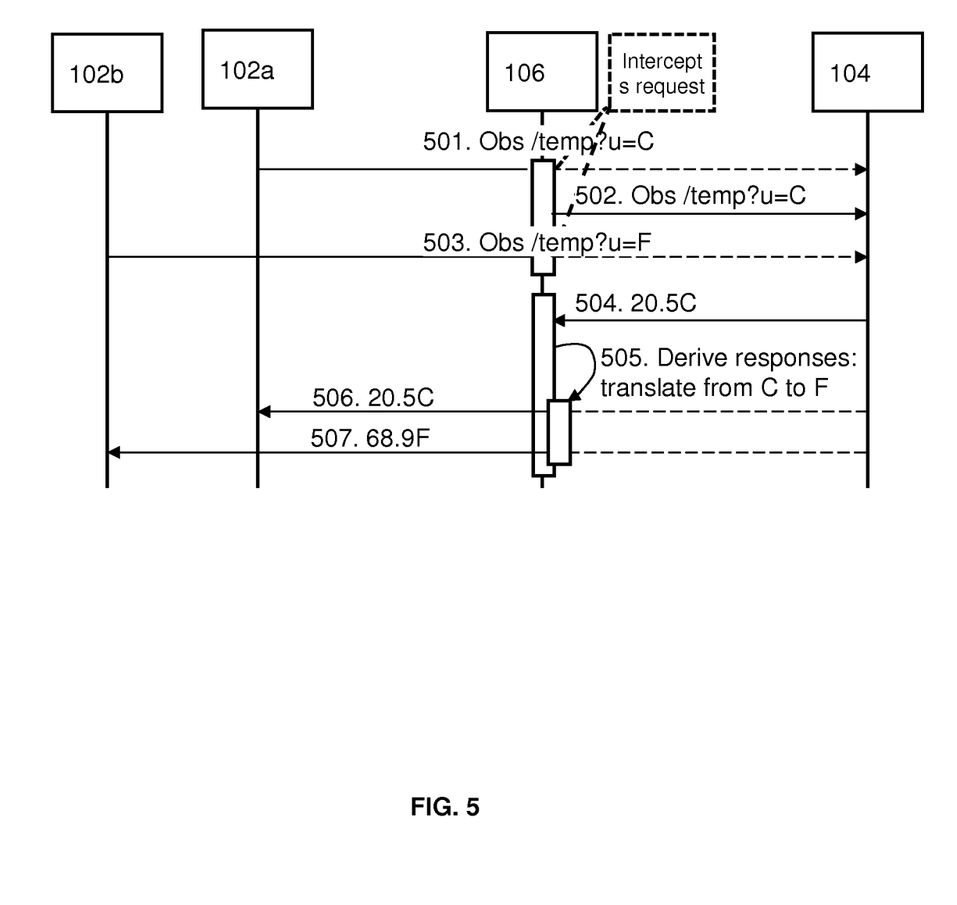
FIG. 5 shows an exemplary messaging diagram illustrating methods for combining two different observe requests, according to one embodiment of the disclosure.

FIG. 5 shows an exemplary messaging diagram illustrating methods for combining two different observe requests, according to one embodiment of the disclosure. A first request is intercepted by an intermediary node 106, wherein the first request is transmitted from a first client 102a and is destined to the server 104 (step 501). The first request requests a first information set in a first (content) format. An example of the first request comprises an observe request "Obs/temp?u=C" to observe the value of the "/temp" resource of the server and the request requests the value(s) of the resource to be returned in Celcius (i.e., the first content format). On behalf of the first client, the intermediary node establishes a server-client session according to the first request with the server (step 502). A second request is intercepted by an intermediary node 106, wherein the second request is transmitted from a second client 102b and is destined to the server (step 503). The second request requests a second information set in a second (content) format different from the first (content) format. An example of the second request comprises an observe request "Obs /temp?u=F" to observe the value of the "/temp" resource in Fahrenheit. The intermediary node determines there is an overlap between the first request and the second request, because value(s) of the "/temp" resource in Celcius is translatable to values(s) in Fahrenheit. Accordingly, the intermediary node determines that the two requests are combinable. Because the second request is already served by the established server-client session, the server-client session is not updated in this example.

Upon receiving data from the server "20.5 C" (step 504), suitable responses are generated/derived in accordance with the first request and the second request (step 505). The intermediary node derives and transmits a first response which forwards the data "20.5 C" to the first client in response to the first request (step 506). The intermediary node processes the data by translating "20.5 C", using a function F=g(C) to derive a second response having the data "68.9 F" to obtain the value for the "/temp" resource according to the second request (step 507). The intermediary node transmits the second response to the second client in response to the second request (step 507).

This example illustrates the intermediary node translating at least a part of a first information set requested by the first request to generate a translated information set in accordance with a second request. Although it is shown that Celcius can be translated to Fahrenheit, other translatable formats such as other convertible units are also envisioned. Furthermore, the first format and the second format may relate to different content formats (e.g., XML, plain text, etc.) which are convertible from one content format to another. The translated information set is then transmitted to the second client in response to the second request. Translation may be applied if at least a part of the second information set requested by the second request is derivable from at least a part of the first information set requested by the first request.

Figure 6:
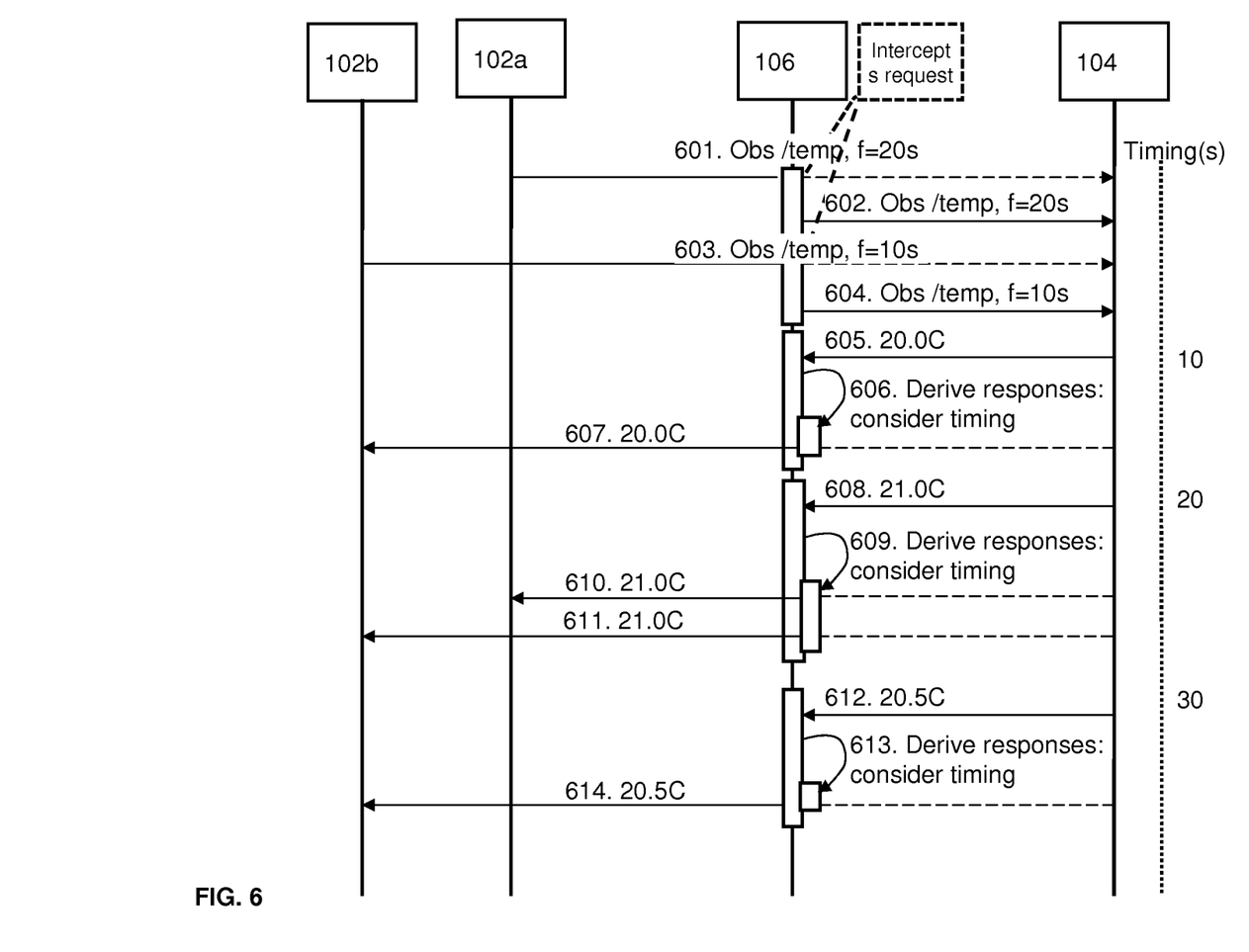
FIG. 6 shows an exemplary messaging diagram illustrating methods for combining two different observe requests, according to one embodiment of the disclosure.

FIG. 6 shows an exemplary messaging diagram illustrating methods for combining two different observe requests, according to one embodiment of the disclosure. A first request is intercepted by an intermediary node 106, wherein the first request is transmitted from a first client 102a and is destined to the server 104 (step 601). The first request requests a first information set according to a first frequency. An example of the first request comprises an observe request "Obs/temp, f=20 s" to observe the value of the "/temp" resource of the server at an interval of 20 seconds. On behalf of the first client, the intermediary node establishes a server-client session according to the first request with the server (step 602). A second request is intercepted by an intermediary node 106, wherein the second request is transmitted from a second client 102b and is destined to the server (step 603). The second request requests a second information set according to a second frequency. An example of the second request comprises an observe request "Obs /temp, f=10 s" to observe the value of the "/temp" resource at an interval of 10 seconds. The intermediary node determines there is an overlap between the first request and the second request, because the first frequency is an integer multiple of the second frequency. Accordingly, the intermediary node determines that the two requests are combinable by determining whether the first request and the second request both indicate a first frequency and a second frequency, respectively, at which a same resource on the server is observed and the first frequency is an integer multiple of the second frequency. Because the second request is not already served by the established server-client session (because the second request requests data from the server more frequently, the server-client session is updated in this example (step 604).

Upon receiving data from the server "20.0 C" (step 605) at 10 seconds, suitable responses are generated in accordance with (if applicable the first request and) the second request, according to the respective frequencies of the first and second requests (step 606). The intermediary node derives and transmits a response which forwards the data "20.0 C" to the second client in response to the second request (step 607) because the second client requests a response having a value of the "/temp" resource every 10 seconds. The intermediary node processes the received response from the server by determining whether it is suitable to generate and transmit the response to the respective clients according to the requested frequencies of the respective requests.

Upon receiving data from the server "21.0 C" (step 608) at 20 seconds, suitable responses are generated in accordance with the first request and the second request, according to the respective frequencies of the first and second requests (step 609). The intermediary node derives and transmits a response which forwards the data "20.0 C" to the first client in response to the first request (step 610) because the first client requests a response having a value of the "/temp" resource every 20 seconds. The intermediary node derives and transmits a response which forwards the data "20.0 C" to the second client in response to the second request (step 611) because the second client requests a response having a value of the "/temp" resource every 10 seconds.

Upon receiving data from the server "20.5 C" (step 612) at 30 seconds, suitable responses are generated in accordance with (if applicable the first request and) the second request, according to the respective frequencies of the first and second requests (step 613). The intermediary node derives and transmits a response which forwards the data "20.0 C" to the second client in response to the second request (step 614) because the second client requests a response having a value of the "/temp" resource every 10 seconds.

At 40 seconds, suitable responses may be generated and transmitted similarly to steps 608, 609, 610, and 611.

Figure 7:
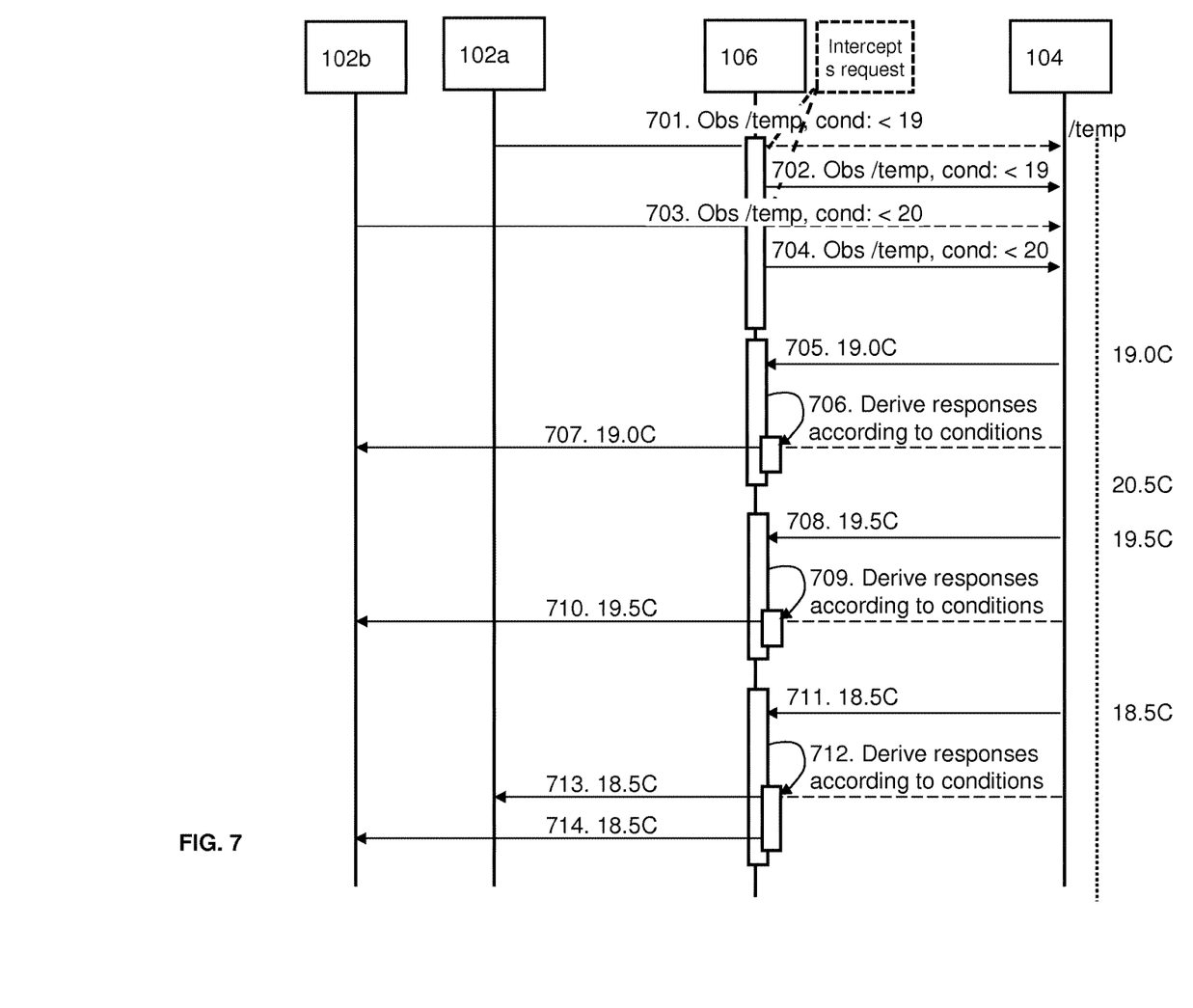
FIG. 7 shows an exemplary messaging diagram illustrating methods for combining two different conditional observe requests, according to one embodiment of the disclosure.

The first request and the second request may not be intercepted at substantially the same time, or at about the same time at the intermediary node. In some embodiments, the intermediary node takes measures to account for requests whose frequencies and their time of interception are not synchronized. For instance, at time 3 s, a first request having a frequency of 20 s is intercepted (where responses are expected at 23 s, 43 s, 63 s, . . . ). The intermediary node establishes a server-client session according to the first request. At time 7, the intermediary node intercepts a second request having a frequency of 10 s (where responses are expected at 17 s, 27 s, 37 s, 47 s, 57 s . . . ). At time 13 (smallest value equal to 3+N*10 that is larger than 7 where N=1, 2, 3, . . . ), the server-client session may be updated to a frequency of 10 s to synchronize the two requests (where responses from the server over this updated server-client session are expected at 13 s, 23 s, 33 s, 43 s, 53 s, 63 s, . . . ). Such an update does not influence responses to the first request, but may cause responses for the second request to be sent 4 seconds earlier (e.g., response expected at 17 s would be transmitted at 13 s). Alternatively, at times 17 s, 27 s, etc. a cached version of the responses received at times 13 s, 23 s, etc. may be sent to the second client. In some other cases, the intermediary node may delay the first response to the second request until time 13 s. For the second client it seems the processing of the request experienced delay and the session was only established at time 13 s. Because of the delay it may be possible that second will be retransmitted during this 6 second interval. In some other cases, the intermediary node may send an immediate response containing an option that indicates that the request will be handled after 6 seconds ("Patience"-like option). In yet some other cases, the intermediary may send an earlier update to the first client, aligning responses at time 17 s, 37 s, 57 s, and so on. In some cases, the intermediary node may establish the server-client session at time 7 s and skip the notification at time 23 s and send it at time 27 s (the resulting effect could otherwise have been caused by delay, packet loss as well). FIG. 7 shows an exemplary messaging diagram illustrating methods for combining two different conditional observe requests, according to one embodiment of the disclosure. A first request is intercepted by an intermediary node 106, wherein the first request is transmitted from a first client 102a and is destined to the server 104 (step 701). The first request requests a first information set according to a first condition in a first conditional observe request. An example of the first request comprises a conditional observe request "Obs /temp, cond: <19" to request a response having the value if the state of the resource "/temp" changes and is less than 19. On behalf of the first client, the intermediary node establishes a server-client session according to the first request with the server (step 702). A second request is intercepted by an intermediary node 106, wherein the second request is transmitted from a second client 102*b* and is destined to the server (step 703). The second request requests a second information set according to a second condition in a second conditional observe request. An example of the second request comprises a conditional observe request "Obs /temp, cond: <20" to request a response having the value if the state of the resource "/temp" changes and is less than 20. The intermediary node determines there is an overlap between the first request and the second request, because the first request and the second request both indicate a first condition and a second condition, respectively, to which the same resource "/temp" is observed and the first condition overlaps with the second condition. Because the second request is not already served by the established server-client session (because the second request requests data from the server more frequently (because it is requesting more resource states), the server-client session is updated in this example (step 704).

Upon receiving data from the server indicating a state change to "19.0 C" (step 705) over the established server-client session, suitable responses are generated in accordance with (if applicable the first request and) the second request, according to the respective conditions of the first and second requests (step 706). The intermediary node derives and transmits a response which forwards the data "19.0 C" to the second client in response to the second request (step 707) because the second client requests a response having the value of the "/temp" resource when the value changes and is less than 20. The intermediary node processes the received response from the server by determining whether it is suitable to generate and transmit the response to the respective clients according to the requested conditions in the respective requests.

Upon receiving data from the server indicating a state change of "19.5 C" (step 708) over the established server-client session, suitable responses are generated in accordance with (if applicable the first request and) the second request, according to the respective conditions of the first and second requests (step 709). The intermediary node derives and transmits a response which forwards the data "19.5 C" to the second client in response to the second request (step 710) because the second client requests a response having the value of the "/temp" resource when the value changes and is less than 20.

Upon receiving data from the server indicating a state change of "18.5 C" (step 711) over the established server-client session, suitable responses are generated in accordance with the first request and the second request, according to the respective conditions of the first and second requests (step 712). The intermediary node derives and transmits a response which forwards the data "18.5 C" to the first client in response to the first request (step 713) because the first client requests a response containing the value of the "/temp" resource when the value changes and is less than 19. The intermediary node derives and transmits a response which forwards the data "18.5 C" to the second client in response to the second request (step 714) because the second client requests a response having the value of the "/temp" resource when the value changes and is less than 20.

Various examples relating to combining conditional observer requests, e.g., as defined by the IETF CoAP protocol are disclosed. The "conditional observe in CoAP" IETF draft by Li et al identifies nine different condition types in the context of observing a resource. A client is said to observe a resource when it is notified every time the state of the resource changes. The conditional observe draft allows a client to specify conditions to which the new resource state has to apply in order for a notification to be sent. Of the nine defined condition types there are six that may be used eligible for combination or considered combinable. These combinable conditions are only illustrative examples, it is envisioned that other conditions may also be combinable. Upon determining that the first request and the second requests are conditional observe requests, rules may be used to determine whether an overlap exists between the first condition and the second condition of the first and the second request, respectively. Exemplary combinable pairs of a first condition and a second condition may have any one of the following pairs of first condition and second condition, said first condition overlapping at least in part with the second condition:

| pair | first condition | second condition |
| --- | --- | --- |
| 1 | Step= | Step= |
| 2 | Value= | Value= |
| 3 | Value= | Value<> |
| 4 | Periodic | Periodic |
| 5 | AllValues< | AllValues< |
| 6 | AllValues> | AllValues> |
| 7 | AllValues> | AllValues< |
| 8 | Step= | Value= |
| 9 | Allvalues> | Value= |
| 10 | Allvalues< | Value= |
| 11 | AllValues< | Value<> |
| 12 | AllValues> | Value<> |
| 13 | AllValues< | Step= |
| 14 | AllValues> | Step= |

The "Step=" condition specifies a minimum state change in a resource on the server before a response is sent to a client.
The "Value=" condition indicates a response is sent to a client when a state of the resource in the server is equal to a value specified in the "Value=" condition.
The "Value<>" condition indicates a response is sent to a client when a state of the resource in the server passes a threshold value, in either direction of the threshold, specified in the "Value<>" condition.
The "Periodic" condition indicates a periodic interval where a response is sent to a client.
The "AllValues<" condition indicates a response is sent when a state of the resource in the server is less than a value specified in the "AllValues<" condition.
The "Allvalues>" condition indicates a response is sent when a state of the resource in the server is greater than a value specified in the "AllValues>" condition.

The intermediary node intercepts requests having the above pairings of the first condition and the second condition, and may store the first condition and the second condition in the storage. When there is an overlap between the first condition and the second condition and the server-client session was established using the first condition, and if there is a part of the second condition which is not overlapping with the first condition, the server-client session is updated accordingly to include that part of the second condition. The relationship manager processes data received by the intermediary node from the server over the (combined) server-client session to determine whether the data meets the first condition and/or the second condition. If the data meets the first condition, the relationship manager derives and transmits the first response to the first client. If the data meets the second condition, the relationship manager derives and transmits the second response to the second client.

Combining two similar conditions is illustrated below.

Step conditions: Two step conditions may be combined when one of the step parameters (S2) is a multiple of the other step parameter (S1). If this is the case, then the combination is a step condition with a step equal to S1. When S2=n*S1 with n a natural number then: Step(S1)+Step(S2)=Step(S) where S=S1

AllValues> conditions: Two allvalues> conditions may be combined into an allvalues> condition with a parameter equal to the minimum of the two input parameters. AllValues>(V1)+AllValues>(V2)=AllValues>(V) where V=min(V1,V2)

AllValues< conditions:
Similarly, two allvalues< conditions can always be combined into an allvalues< condition with a parameter equal to the maximum of the two input parameters.
AllValues<(V1)+AllValues<(V2)=AllValues<(V) where V=max(V1,V2)

Value=conditions: Combining two value=conditions is possible in the trivial case when both values are equal.

Value< > conditions: Combining two value< > conditions is only possible in the trivial case when both values are equal.

Periodic conditions: Combining two periodic conditions is possible although one of the two clients may receive a cached resource value. The intermediary node may send the most recent state of the resource to the clients. It is only when one of the periods is the multiple of the other that both clients may receive a 'fresh' state. In all other cases the client with the lowest period (let this be P1) may receive a 'fresh' state, the client with the highest period (let this be P2) may receive a state with a maximum age equal to n*P2% P1 where n is the natural number for which this expression reaches its absolute maximum and % is the modulus operation. When the maximum age becomes too large, the intermediary node may avoid combining two periodic conditions. Periodic(P1)+Periodic(P2)=Periodic(P) where P=min(P1,P2)

Combining less similar conditions are illustrated below.

AllValues> and AllValues< conditions: Depending on the exact bounds these two conditions simplify to a normal observation (i.e. notify all resource state changes) or don't simplify. AllValues>(V1)+AllValues<(V2)=Observe when V1<=V2

Step and Value=conditions: When the value=parameter is equal to a (previously received) resource state plus or minus a multiple of the step parameter, it is possible to combine the two conditions into one step condition with the same parameter. Every time the step size is exceeded, the intermediary is notified and has to check whether not the specified value has been reached. If so, it has to notify the client. When V=r+n*S or V=r−n*S with n a natural number and r a (previously received) resource state then: Step(S)+Value=(V)=Step(S)

AllValues< and Value=conditions: When the value=parameter is smaller than the allvalues< parameter, it is possible to absorb the second condition into the first. For every notification that the intermediary receives it has to check whether or not it has to notify the other client. When V2<V1 then AllValues<(V1)+Value=(V2)=AllValues<(V1)

AllValues> and Value=conditions: This is the complementary case of the previous combination. When V2< >V1 then AllValues>(V1)+Value=(V2)=AllValues>(V1)

AllValues< and Value< > conditions: When the value< > parameter is smaller than the allvalues< parameter, it is possible to absorb the second condition into the first. Every time the intermediary receives a notification it has the check whether or not the second client has to be notified (i.e. was the threshold passed?). When V2<V1 then AllValues<(V1)+Value< >(V2)=AllValues<(V1)

AllValues> and Value< > conditions: This is the complementary case of the previous combination. When V2>V1 then AllValues>(V1)+Value< >(V2)=AllValues>(V1)

AllValues< and Step=conditions: Depending on the relationship between the allvalues<, step=parameters and the resource state it is possible to combine these two condition. When r<V−S (with r the resource state, V the allvalues< parameter and S the step parameter), then the step condition can be absorbed into the allvalues< condition. When the intermediary detects that r becomes larger or equal to V−S, the combination is no longer possible and it has to register the step=condition with the sensor. When r again drops below V−S, the intermediary can unregister the second condition. When r<V−S then AllValues<(V)+Step=(S)=AllValues<(V) with r the resource state AllValues> and Step=conditions: This is the complementary case of the previous combination. When r>V+S then AllValues>(V)+Step=(S)=AllValues>(V) with r the resource state FIGS. 2-7 are described in terms of steps to be performed, but it is not to be construed that the steps described must be performed in the exact order described and/or one after another. One skilled in the art may envision to change the order of the steps and/or to perform steps in parallel to achieve equivalent technical results.

With some modifications, one skilled in the art may extend the embodiments described herein to other architectures, networks, or technologies.

Various embodiments of the invention may be implemented as a program product for use with a computer system or a processor, where the program(s) of the program product define functions of the embodiments (including the methods described herein). In one embodiment, the program(s) can be contained on a variety of non-transitory computer-readable storage media (generally referred to as "storage"), where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored.

It is to be understood that any feature described in relation to any one embodiment may be used alone, or in combination with other features described, and may also be used in combination with one or more features of any other of the embodiments, or any combination of any other of the embodiments. Moreover, the invention is not limited to the embodiments described above, which may be varied within the scope of the accompanying claims.

The invention claimed is:

1. A method for an intermediary node to reduce a number of server-client sessions between a server and a plurality of clients communicably connected to the server over a network, the method comprising:

intercepting, at the intermediary node, a first request destined to the server from a first client;

establishing a server-client session between the intermediary node and the server on behalf of the first client using the first request;

intercepting, at the intermediary node, a second request destined to the server from a second client, said second request being different from the first request;

determining a first information set requested by the first request;

determining a second information set requested by the second request;

determining whether the first request overlaps in part with the second request, based on whether at least part of the second information set is derivable from at least a part of the first information set;

if the first request overlaps in part with the second request and if a part of the second request is not overlapping with the first request, updating the server-client session between the intermediary node and the server on behalf of the two clients into an aggregate server-client session including the part of the second request which is not overlapping with the first request.

2. The method according to claim 1, further comprising:

receiving data at the intermediary node from the server over the server-client session in accordance with the first request and the second request;

deriving a first response and optionally a second response from the data, said first response in accordance with the first request and said second response in accordance with the second request.

3. The method according to claim 2, further comprising:

transmitting, from the intermediary node, the first response in response to the first request to the first client; and optionally, transmitting, from the intermediary node, the second response in response to the second request to the second client.

4. The method according to claim 1, further comprising:

filtering at least a part of the first information set to generate a filtered information set in accordance with the second request;

transmitting the filtered information set to the second client in response to the second request.

5. The method according to claim 1, wherein at least a part of the first information set is in a first format and the second information set is in a second format different from the first format, the method further comprising:

translating the at least a part of the first information set to generate a translated information set in the second format;

transmitting the translated information set to the second client in response to the second request.

6. The method according to claim 1, further comprising:

receiving a third request from a first client to terminate the first request, and/or determining the first request has expired;

updating the server-client session between the intermediary node and the server to remove a part of the first request, said part not overlapping with the second request.

7. The method according to claim 1, wherein the server comprises a constrained device, and optionally, the server is communicably connected to the intermediary node over a low power and lossy network.

8. An intermediary node for reducing a number of server-client sessions in a network between a server and a plurality of clients, the intermediary node comprising:

a receiver for intercepting, at the intermediary node, a first request destined to the server from a first client;

a relationship manager for establishing a server-client session between the intermediary node and the server on behalf of the first client using the first request;

the receiver further for intercepting, at the intermediary node, a second request destined to the server from a second client, said second request being different from the first request;

the relationship manager further for:

determining a first information set requested by the first request;

determining a second information set requested by the second request;

determining whether the first request overlaps in part with the second request, based on whether at least part of the second information set is derivable from at least a part of the first information set;

if the first request overlaps in part with the second request and if a part of the second request is not overlapping with the first request, updating the server-client session between the intermediary node and the server on behalf of the two clients into an aggregate server-client session including the part of the second request.

9. A system comprising at least one server, and an intermediary node of claim 8, said intermediary node communicably connected to the at least one server and at least one client.

10. A computer program product, implemented on computer-readable non-transitory storage medium, the computer program product configured for, when run on a computer, executing the method steps according to claim 1.

* * * * *